United States Patent [19]

Taylor

[11] 4,022,316
[45] May 10, 1977

[54] BOOT CONSTRUCTION FOR A BUCKET ELEVATOR

[75] Inventor: Edmund P. Taylor, Greencastle, Ind.

[73] Assignee: Bryant-Poff, Inc., Coatesville, Ind.

[22] Filed: Feb. 11, 1976

[21] Appl. No.: 657,089

[52] U.S. Cl. .............................. 198/860; 198/709
[51] Int. Cl.² ...................................... B65G 21/00
[58] Field of Search .......... 198/140, 206, 207, 231, 198/709, 860, 861

[56] References Cited

UNITED STATES PATENTS

| | | | |
|---|---|---|---|
| 382,772 | 5/1888 | Seeley | 198/207 |
| 661,879 | 11/1900 | Levalley | 198/207 |
| 718,907 | 1/1903 | Burmeister | 198/206 |
| 1,660,939 | 2/1928 | Snow | 198/207 |
| 1,925,024 | 8/1933 | Slater | 198/207 |
| 1,954,508 | 4/1934 | Winter | 198/207 |
| 2,513,963 | 7/1950 | Patterson | 198/231 UX |
| 3,034,667 | 5/1962 | Kline et al. | 198/206 X |
| 3,319,774 | 5/1967 | Christensen | 198/206 |
| 3,343,654 | 9/1967 | Fisher | 198/207 |

FOREIGN PATENTS OR APPLICATIONS

| | | | |
|---|---|---|---|
| 718,288 | 9/1965 | Canada | 198/140 |

*Primary Examiner*—Evon C. Blunk
*Assistant Examiner*—Richard K. Thomson
*Attorney, Agent, or Firm*—Barnes, Kisselle, Raisch & Choate

[57] ABSTRACT

A bucket elevator wherein the boot extending between the upright hollow legs of the elevator has a readily removable cover at its upper end. The bucket belt is trained around an idler pulley journalled in the boot. The bearings for the opposite ends of the pulley shaft are mounted on a pair of support rods which extend vertically in the boot and upwardly through the cover thereon. The upper ends of the support rods are accessible from above the cover for adjusting the support rods and the pulley vertically in the boot.

6 Claims, 7 Drawing Figures

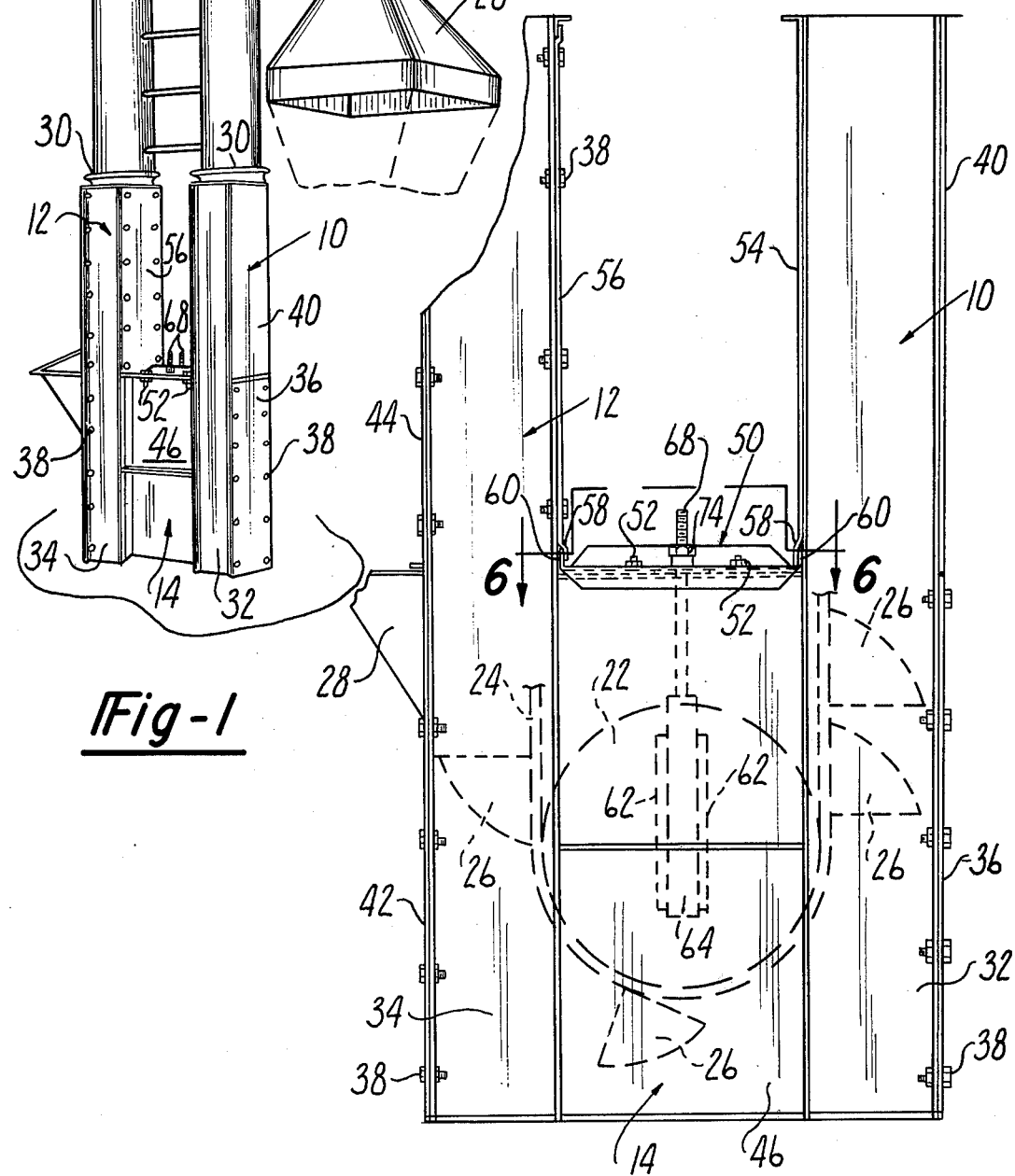

BOOT CONSTRUCTION FOR A BUCKET ELEVATOR

This invention relates to bucket elevators of the type frequently used in connection with the storage of grain and, more particularly, to a boot construction therefore.

Bucket elevators of the type to which the invention relates are constructed with two upright hollow legs connected at their lower ends by a boot and connected at their upper ends by a grain discharge hood. An endless belt on which buckets are attached is trained around an idler pulley in the boot and a motor-driven pulley in the discharge hood. Grain is discharged from a hopper into the lower end of the leg in which the buckets are travelling upwardly and is discharged from the buckets at the upper end of the elevator into a discharge chute.

The idler pulley is conventionally mounted on a shaft journalled in bearings on the outer sides of the two side panels of the boot. With such conventional pulley mounting, the bearings are exposed to severe weather conditions and servicing and replacing the boot pulley becomes a difficult task. In order to obtain access to or remove the boot pulley, at least one of the side panels of the boot and the corresponding pulley shaft bearing has to be removed.

The object of the present invention is to eliminate the above-described pulley servicing problems associated with bucket elevators of conventional design.

More specifically, the invention resides in a boot construction for a bucket elevator wherein the pulley shaft bearings are mounted within the boot rather than exteriorly thereof and are so arranged as to be adjustable from outside the boot without removing any sections of the boot.

Another object of the invention resides in the provision of a boot construction for a bucket elevator wherein the whole pulley assembly is mounted on a cover plate for the boot and can be removed and replaced for servicing by simply removing the boot cover and an adjacent end panel on one leg of the elevator and then lifting the entire pulley assembly out of the boot.

Other objects and features of the present invention will become apparent from the following description and accompanying drawings, in which:

FIG. 1 is a perspective view of a bucket elevator embodying the present invention;

FIG. 2 is a fragmentary side elevational view of the lower portion of the elevator;

Figure 3:
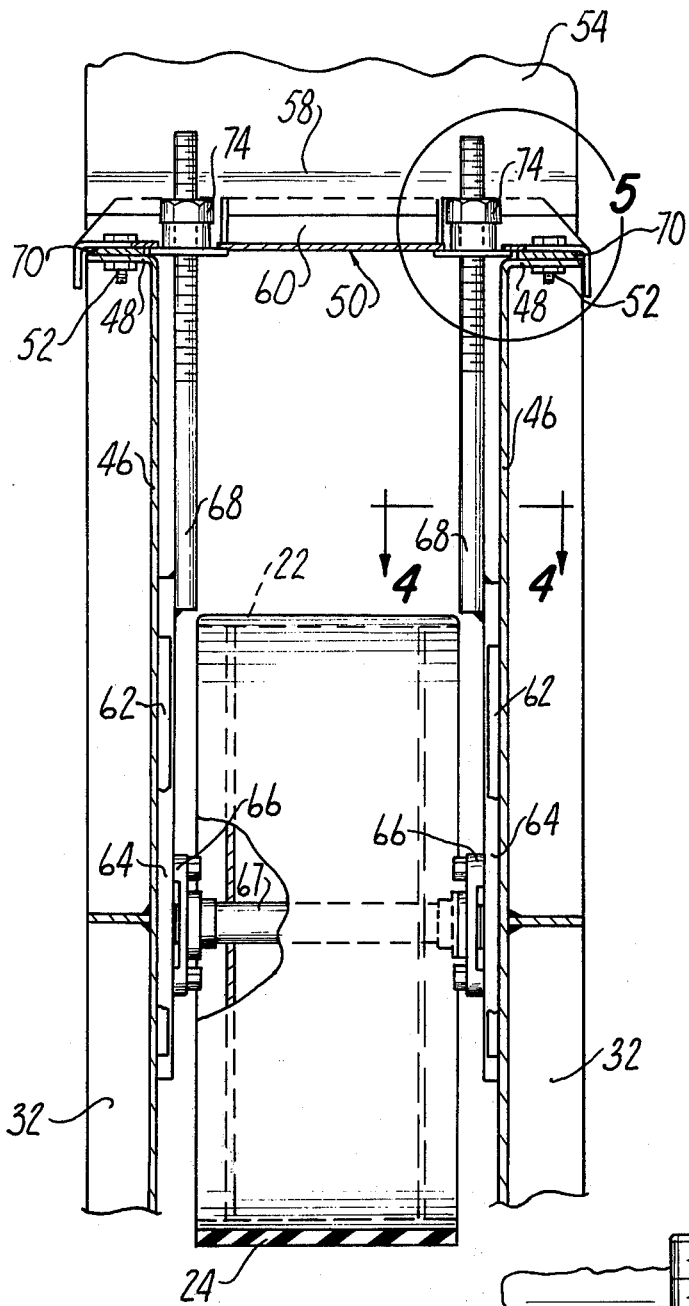
FIG. 3 is a fragmentary sectional view through the boot of the elevator.
Figure 4:
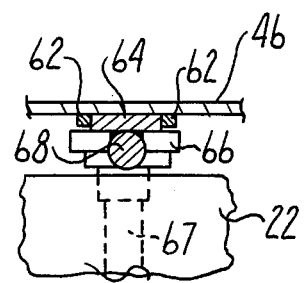
FIG. 4 is a sectional view along the line 4—4 in FIG. 3.
Figure 5:
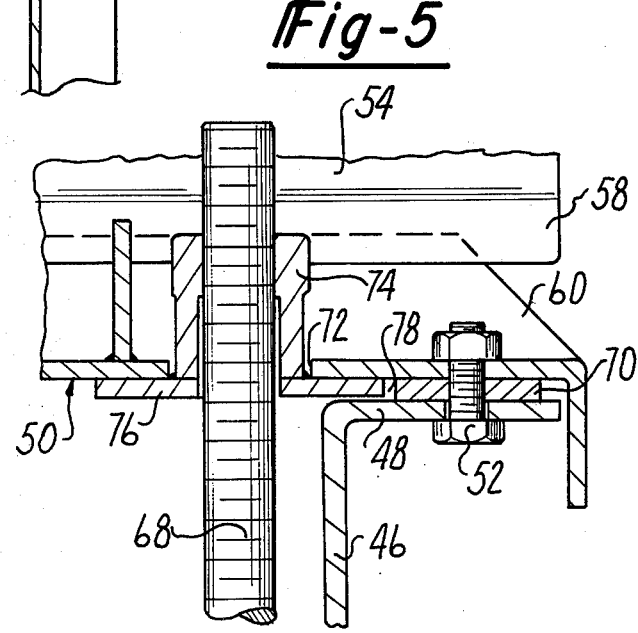
FIG. 5 is an enlarged sectional view of the portion designated 5 in FIG. 3.
Figure 6:
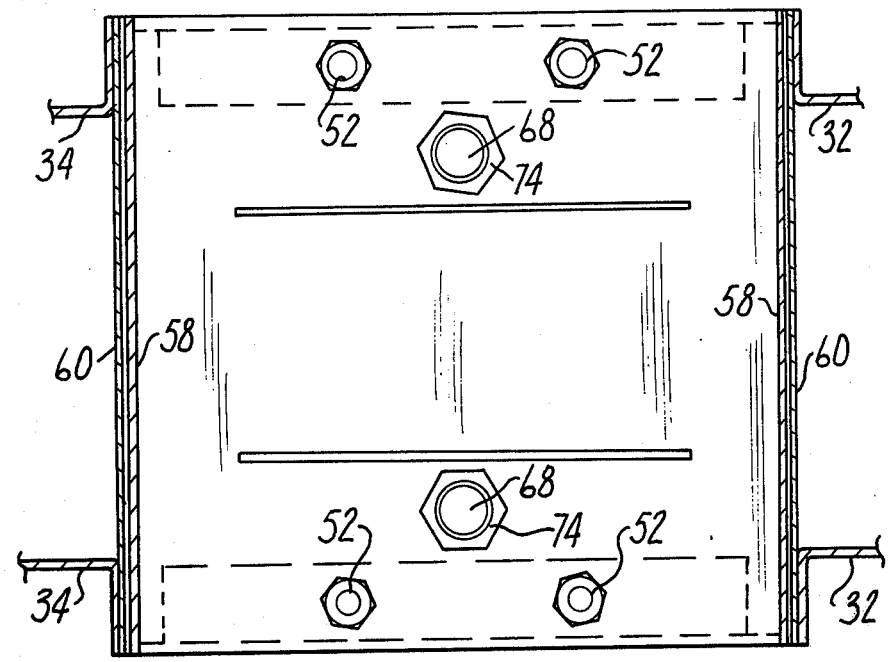
FIG. 6 is a fragmentary sectional view along the line 6—6 in FIG. 2.
Figure 7:
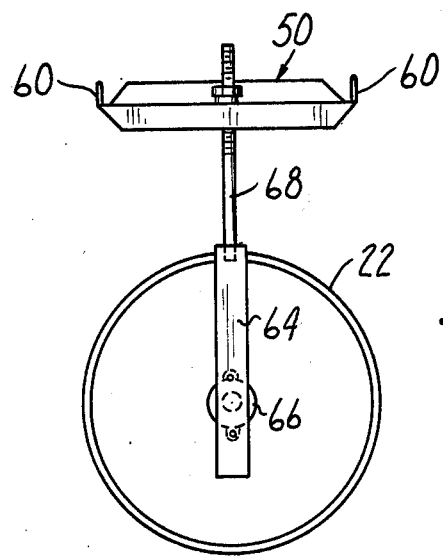
FIG. 7 is a side elevational view of the pulley and boot cover assembly.

Referring to FIG. 1, the bucket elevator there illustrated is of conventional design in most respects. The elevator includes two hollow legs 10 and 12 connected at their lower ends by a boot 14 and connected at their upper ends by a hood 16 having an outlet portion 18 which discharges into a suitable collector 20 in which the grain is cleaned and from which the grain may be distributed to a desired location. Within boot 14 there is arranged an idler pulley 22 and within hood 16 there is arranged a motor-driven pulley (not illustrated). A belt 24 is trained around these pulleys. A plurality of buckets 26 is fastened to belt 24. The pulley in hood 16 is driven so that the buckets 26 travel downwardly in leg 10 and upwardly in leg 12. Adjacent its lower end leg 12 is provided with a hopper 28 through which grain is dumped into the lower end of the elevator to be picked up by the buckets 26 and discharged from hood 16 through outlet 18. The general construction thus far described is conventional.

Referring now to the drawings in greater detail, the lower halves of legs 10 and 12 are of rectangular cross section and the upper halves thereof are of circular cross section, the upper and lower halves being connected by collars 30. The front and rear sides of the rectangular section of leg 10 are defined by channels 32 and the front and rear sides of the rectangular section of leg 12 are likewise defined by channels 34. The outer end face of the lower portion of leg 10 is defined by a sheet metal panel 36 secured to the flanges of channels 32 by screws, such as at 38. The outer face of the upper portion of leg 10 is defined by a panel 40 which is welded to the flanges of channels 32. The outer face of the portion of leg 12 below hopper 28 is defined by a panel 42 and the upper portion thereof by a panel 44 (FIG. 2). Panels 42,44 are fastened to flanges of channels 34 by screws, as shown at 38.

Boot 14 comprises two end panels 46 (FIGS. 2 and 3) which are welded along opposite vertical edges to the inner flanges of channels 32,34. At their upper ends the boot end panels 46 are formed with outwardly directed flanges 48 on which a boot cover plate 50 is mounted by screws 52. Above cover 50 the inner side of leg 10 is defined by a panel 54 welded to the inner flanges of channels 32. Likewise, the upper inner side of leg 12 is defined by a panel 56 secured to the inner flanges of channels 34, as by screws 38. The lower ends of panels 54,56 are slightly offset as at 58 to overlap upright flanges 60 along each side of cover 50 and thereby provide a weather-resistant connection between cover 50 and legs 10, 12.

On the inner face of each boot side panel 46 there is mounted a pair of spaced apart guide bars 62. Bars 62 form vertical guideways for slide bars 64 on which are secured bearings 66 in which the ends of the shaft 67 of pulley 22 are journalled. The upper ends of slide bars 64 are connected as by welding to the lower ends of threaded support rods 68 which extend upwardly through cover 50. Cover 50 is retained on flanges 48 of the boot side panels 46 in a slightly raised position by spacers 70. The cover is formed with openings 72 to receive with a loose fit the lower ends of nuts 74 threaded on support rods 68. Each nut 74 has a radially enlarged flange 76 at the lower end thereof. Flanges 76 project into the space 78 between cover 50 and flanges 48. Thus, the radially enlarged flange 76 on each nut 74 traps the nut vertically relative to the cover. The pulley assembly is therefore supported vertically in boot 14 by the flanges 76 of nuts 74 which rest on flanges 48 of boot side wall panels 46.

The above-described construction has numerous advantages over bucket elevator boots of conventional design. It will be noted that bearings 66 are enclosed within boot 14 and are, therefore, not exposed to the weather. Likewise, it will be appreciated that pulley 22 can be adjusted up and down by simply rotating nuts 74 at the upper ends of support rods 68. In addition, in servicing the pulley and its bearings, if it becomes necessary to remove and replace the pulley, this can be accomplished by a relatively simple procedure. First the screws 52 which secure the cover to the flanges 48 are removed; then the inner end panel 56 of leg 12 is removed. This allows cover 50 to be tilted upwardly slightly to disengage the upwardly turned flange 60 from beneath the offset bend 58 at the lower end of the welded panel 54. Cover 50 can be tilted sufficiently to produce this disengagement not only because the fit between offset bend 58 and flange 60 is not tight, but also because the openings 72 in cover 50 are slightly larger than nuts 74 and because there is a slight clearance between guide bars 62 and slide bars 64 and support rods 68 are at least slightly flexible. As soon as cover 50 is disengaged from the offset bend 58 at the lower end of panel 54 the cover can be completely removed from the upper end of boot 14. Thereafter the two support rods 68 can be lifted to vertically disengage slide bars 64 from guide bars 62. Since the inner end panel 56 of leg 12 has been removed the entire pulley assembly can be lifted out of the boot even though pulley 22 may be of slightly greater diameter than the spacing between the two legs 10 and 12.

I claim:

1. In a bucket elevator of the type comprising a pair of upright legs connected at their lower ends by a boot, a vertical adjustable pulley journalled in the boot, a bucket elevator belt trained around said pulley, a pair of upright threaded support rods in said boot each connected at its lower end to a bearing block in which the pulley shaft is supported, the improvement which comprises a cover at the upper end of said boot, means releasably securing said cover to said boot, said cover having a pair of openings therein through which said support rods extend upwardly, a pair of nuts threaded on said support rods, said nuts having flanges thereon disposed on the underside of the cover, said flanges being larger than said openings so that they are adapted to bear against the underside of the cover and means within said boot engaging the bottom faces of said flanges to trap the nuts vertically on said boot when the cover is secured to the boot, whereby relative rotation between the support rods and nuts effects vertical adjustment of the pulley.

2. The improvement called for in claim 1 wherein said nuts project upwardly through said openings and are adapted to be rotated to adjust said support rods vertically.

3. The improvement called for in claim 2 wherein the boot has a pair of side walls provided with laterally extending flanges at their upper ends, said cover being removably secured on said wall flanges, the flanges on the nuts being disposed between the top face of the wall flanges and the underside of the cover.

4. The improvement called for in claim 3 including spacer means disposed between said cover and said wall flanges for accommodating the flanges on the nuts and to permit rotation of the nuts.

5. The improvement called for in claim 1 wherein said legs are hollow and accommodate buckets on said belt, said legs having confronting inner panels extending upwardly from said cover, at least one of said inner panels being secured to its respective leg by removable fasteners to permit removal of said one panel for facilitating lifting of the pulley out of the boot.

6. The improvement called for in claim 5 wherein said pulley has a diameter greater than the distance between said confronting inner panels and a width less than the width of said legs, whereby, when said cover and said one panel are removed, the pulley can be lifted out of said boot by shifting it laterally into the leg from which the one panel has been removed and thereafter lifting it vertically out of the boot.

* * * * *